United States Patent
Mundus

[15] 3,650,449
[45] Mar. 21, 1972

[54] INTERMITTENT FEEDING APPARATUS FOR A WEB OF PAPER OR PLASTICS MATERIAL

[72] Inventor: Friedhelm Mundus, Lengerich of Westphalia, Germany

[73] Assignee: Windmoller & Holscher, Lengerich of Westphalia, Germany

[22] Filed: Jan. 27, 1970

[21] Appl. No.: 6,152

[30] Foreign Application Priority Data

Feb. 4, 1969  Germany .......................... P 19 05 454.7

[52] U.S. Cl. ............................................................. 226/142
[51] Int. Cl. ............................................................ B65h 17/22
[58] Field of Search ........................... 226/142, 137, 139, 141

[56] References Cited

UNITED STATES PATENTS

| 1,935,780 | 11/1933 | McChesney et al. | 226/142 |
| 295,181 | 3/1884 | Leblond | 226/142 |

*Primary Examiner*—Allen N. Knowles
*Attorney*—Fleit, Gipple & Jacobson

[57] ABSTRACT

Apparatus for intermittently feeding a web of material, comprising a pair of feed rollers, intermittent rotating means for the feed rollers including a reciprocatable rack coupled to the feed rollers by transmission gears and a clutch, and means for reciprocating the rack, said reciprocating means comprising a reciprocating drive for rocking a rocker arm about a pivot of fixed location by means of a first link hinged to the rocker arm, a second link hinged to the rocker arm and to the rack, and adjusting means on the rocker arm for altering the spacing between the pivot of the rocker arm and the hinge point to the rocker arm of one of the links.

1 Claims, 4 Drawing Figures

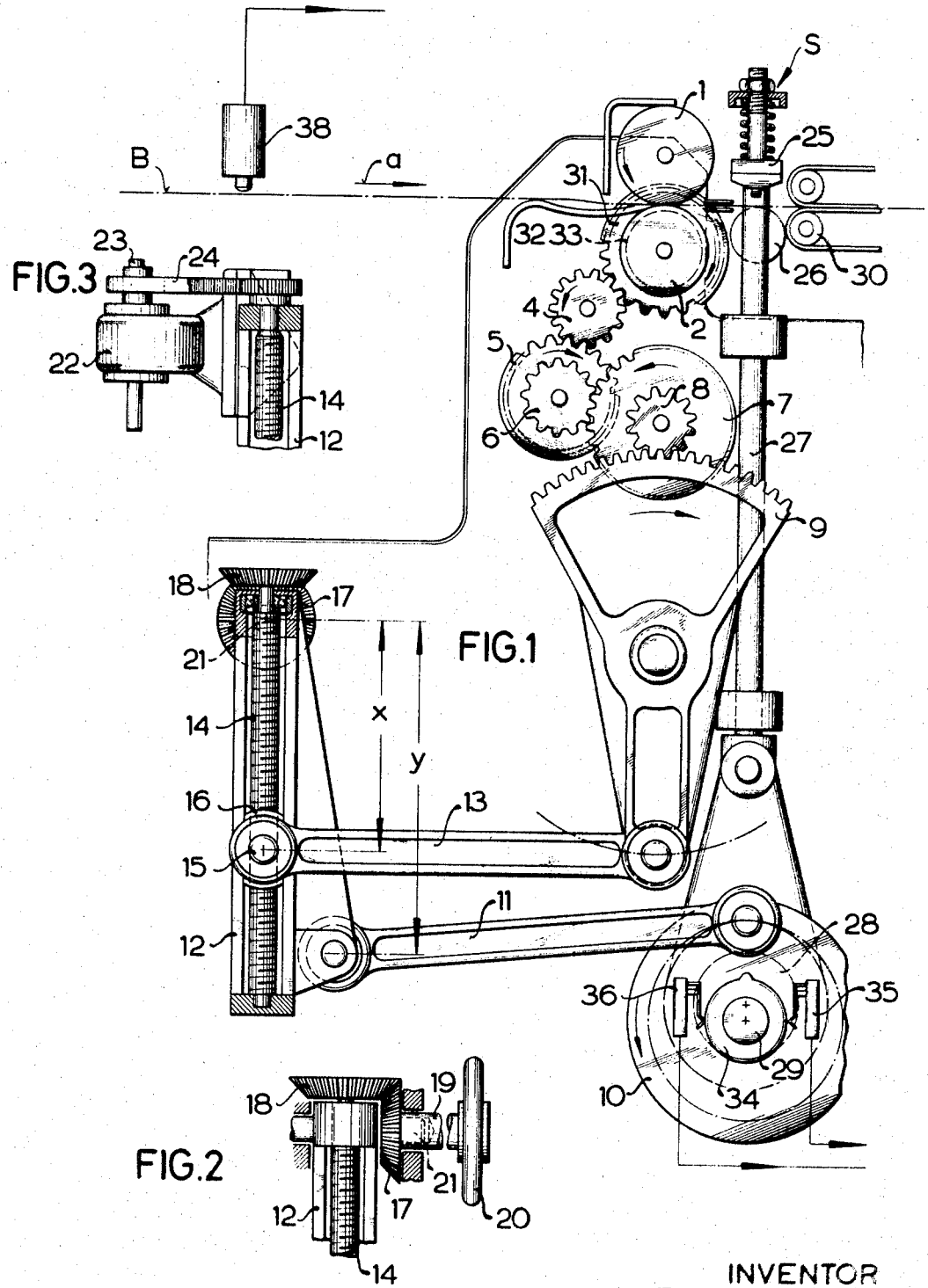

INTERMITTENT FEEDING APPARATUS FOR A WEB OF PAPER OR PLASTICS MATERIAL

The invention relates to intermittent feeding apparatus for a web of paper or plastics material that is to be processed in a machine. The invention is particularly applicable to bagmaking machines in which a two-ply web of flattened tubular plastics film is provided with transverse weld lines to form bags which are then severed from the web. When applied to such machines, the apparatus of the present invention may serve to feed the web to the welding equipment, hold the web stationary during welding and possibly also during severing of each bag, and then feed more of the web to the welding equipment.

Such known intermittent feeding apparatus comprise a pair of feed rollers which engage the web and which are intermittently rotated by a reciprocatable straight or curved rack acting through intermediate gears and a freewheeling device or a combination clutch-brake. As the feed rollers are rotated, a predetermined length of web is fed into position at the transverse welding and severing equipment, the freewheeling device or combination clutch-brake ensuring that the feed rollers are turned only while the rack is moving in one direction and are stationary while the rack is moving in the opposite direction. Welding and severing of the web is effected while the feed rollers are stationary. The reciprocating stroke of the rack determines the length by which the web is advanced each time the feed rollers are actuated. In bagmaking machinery, the length of stroke of the rack therefore determines either the length or the width of each bag to be made, depending on whether the two-ply web is a complete flattened tube or is formed by sheet material that is folded double or by a flattened tube that is slit along one fold line.

For the purpose of adjusting the length of web that is fed by the intermittent feeding apparatus, for example for changing the length or width of the bags to be made in a bagmaking machine, it is known to reciprocate the rack with the aid of a crank of which the crank radius is adjustable. Such adjustment can be effected reliably only while the machine is inoperative and it also requires the crank to be mounted at a readily accessible position of the machine and certainly not inside a gear box. Adjustment of the crank radius during operation of the machine, for example by means of differential gearing, causes the adjusting spindle and its mounting to be excessively heavily loaded by the full force of the crank rod at the dead center positions of the crank. The crank radius required to provide very fine adjustment would call for a large crank disc and a correspondingly long rack both of which take up a lot of space.

The present invention aims to provide an improved intermittent feeding apparatus.

According to the invention, an apparatus for intermittently feeding a web of material comprises a pair of feed rollers, intermittent rotating means for the feed rollers including a reciprocatable rack coupled to the feed rollers by transmission gears and a clutch, and means for reciprocating the rack, the reciprocating means comprising a reciprocating drive for rocking a rocker arm about a pivot of fixed location by means of a first link hinged to the rocker arm, a second link hinged to the rocker arm and to the rack, and adjusting means on the rocker arm for altering the spacing between the pivot of the rocker arm and the hinge point to the rocker arm of one of the links. Preferably, the reciprocating drive comprises a crank disc, in which case the first link is formed by a crank rod connected to the rocker arm by a first hinge pin and the second link is formed by a connecting rod connected to the rocker arm by a second hinge pin.

By changing the spacing of one of the hinge pins from the fixed pivot of the rocker arm, the length by which the web of material is fed at each step can be altered in the same way as with the aforementioned known crank of which the crank radius is adjusted. With the invention however the machine can remain in operation without the disadvantages that are involved by changing the crank radius. This is because the rocker arm executes only pendulating motion, an adjusting spindle that may be used for changing the position of one of the hinge pins does not have to rotate (thereby effecting a saving in space) and such an adjusting spindle would not be loaded axially but only transversely thereto. If the adjusting means comprise such a spindle, it is preferably screw-threaded and rotatably mounted to extend along the rocker arm, a nut member which carries one of the hinge pins being engaged on the spindle and slidable along the rocker arm upon rotation of the spindle.

The spindle may be rotated by hand or, if the rocker arm is provided at an inaccessible position of the machine, it may be turned by a motor or by a hinged linkage actuated from a different position alongside the machine. Since the length of the rocker arm is a multiple of the crank radius, very fine adjustment is possible even though a small crank disc is used. The apparatus therefore permits feeding of the web material to be set very accurately.

No matter how the spindle is turned, a hand wheel or the mechanical connection between the spindle and the hinged linkage or motor can be readily made at the fixed pivot of the rocker arm or in the immediate vicinity thereof where the pendulating movement of the rocker arm is a minimum. The spindle could also be turned by bevel gearing, for example a pinion which is substantially coaxial with the pivotal axis of the rocker arm and a gear fixed to the spindle. The pinion will then not participate in the swinging movements of the rocker arm and thus bevel gearing will permit very accurate adjustment of the aforementioned hinge pin relatively to the rocker arm pivot and consequently very fine adjustment of the distance by which the web is fed at each step, the pinion of the bevel gearing being turned either by hand or mechanically with the aid of a servo motor.

In another form of the invention, the spindle is turned by an electric motor which is carried by the rocker arm so that the need for any hinged linkage is avoided. This construction is particularly favorable in cases where the rocker arm is inaccessible or accessible only with difficulty.

Examples of the invention are illustrated in the accompanying diagrammatic drawings, wherein:

FIG. 1 is a side elevation for the intermittent feeding apparatus of a two-ply web supplied to a bagmaking machine of which a portion is also illustrated;

FIG. 2 is a front elevation of turning means for an adjusting spindle of the FIG. 1 apparatus;

FIG. 3 is a side elevation of different turning means for the adjusting spindle.

Figure 4:
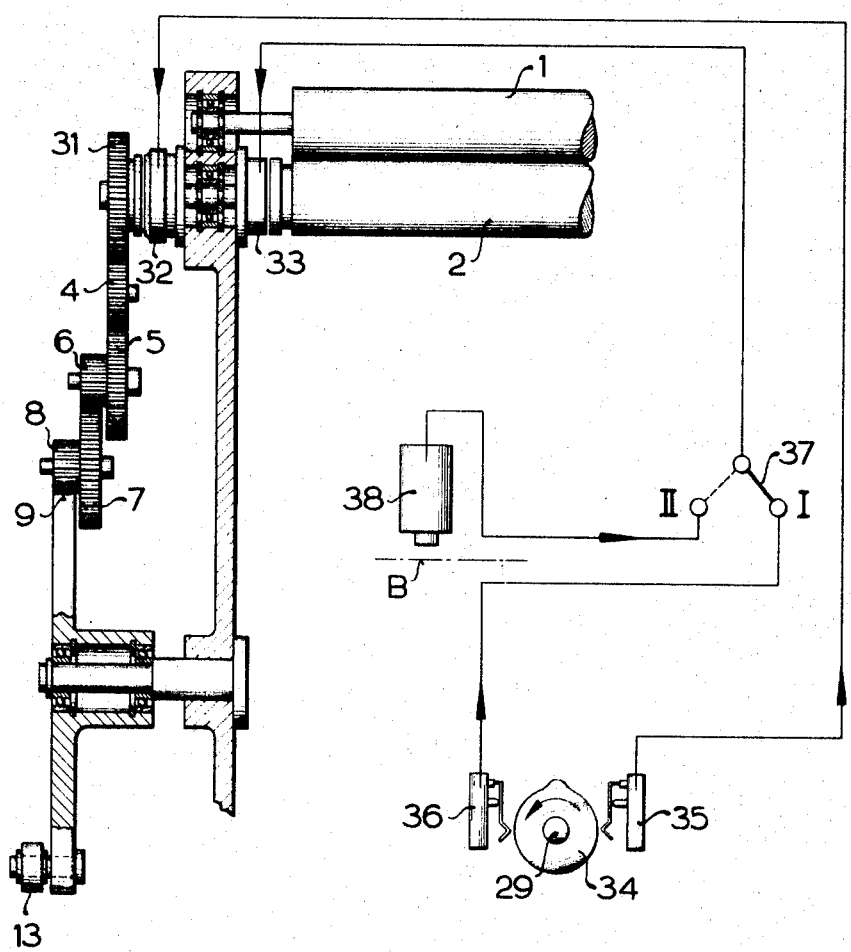
FIG. 4 is a fragmentary front elevation of parts of the FIG. 1 apparatus, including a circuit diagram.

Referring to FIG. 1, the intermittent feeding apparatus is intended to feed a two-ply web B of plastics film in the direction of the arrow a to transverse welding equipment S of a bagmaking machine. The plies of the web are integral along one longitudinal edge of the web which may be formed either by folding a single ply of material or, if the film was made in tubular form and flattened, by slitting the tube along one longitudinal edge. The transverse welding equipment S may also serve as severing equipment. Each time that the web B is stationary, the equipment S welds the two plies of the web transversely across the entire width of the web, successive weld lines being spaced from one another equivalent to the width of the bags to be made, the open longitudinal edge of the web being left open so that each bag will have a filling opening. Simultaneously, the equipment S severs the individual bags from the web. It will be evident that the weld lines applied by the equipment S form the sides of the bag, its base being already closed by the fold line along one longitudinal edge of the web.

Intermittent feeding of the web B is effected by a pair of feed rollers 1, 2 which engage the web from above and below and which are driven through a clutch 32 and transmission gears 31 and 4 to 8 by a reciprocating rack segment 9. By means of the clutch 32, movement of the rack segment 9 in only one direction is transmitted to the feed rollers so that the web is fed in the direction of the arrow *a*. During movement of the rack segment 9 in the opposite direction, the clutch 32 is disengaged while a brake 33 holds the feed rollers 1, 2 stationary.

The clutch 32 is engaged by a switch disc 34 mounted on shaft 29 (also see FIG. 4). Shortly before the rack 9 reaches one end of its stroke, the disc 34 actuates a switch 35 to disengage the brake 33 and engage the clutch 32. After the web B has been fed by a predetermined distance and shortly before the rack 9 reaches the other end of its stroke, the switch disc 34 actuates the switch 36 which, if a selector switch 37 is in the position I indicated in FIG. 4, will then cause the clutch 32 to be disengaged and the brake 33 to be applied.

When making bags from printed material, the selector switch 37 can be moved to position II so that a signal for stopping the feed rollers 1, 2 can be given by a photocell 38 which scans the printed matter and at the appropriate time causes the clutch 32 to be disengaged and the brake 33 to be applied.

In this way the web of bag material is fed in steps by the feed rollers The distance by which the web is fed at each step, namely the width of each bag to be made, is governed by the length of stroke of the rack 9. The latter is reciprocated by a crank and beam mechanism comprising a crank disc 10, a crank rod 11 and a rocker arm 12. The crank and beam mechanism is hinged to the rack 9 by a connecting rod 13. Within the rocker arm 12 and extending longitudinally thereof there is a rotatably mounted screw-threaded spindle 14. A nut member 16 which carries a hinge pin 15 for the connecting rod 13 and is engaged over the spindle is displaceable lengthwise of the rocker arm when the spindle is turned. To turn the spindle 14 there is a pair of bevel gears 17, 18 (also see FIG. 2), of which the pinion 17 is coaxial with a pivot shaft 21 of the rocker arm. The shaft 21 has a fixed location. The pinion 17 can be turned by a hand wheel 20 acting through a hollow shaft 19 around the pivot shaft 21. The bevel gear 18 is fixed to the screw-threaded spindle. In a different form of the invention, the screw-threaded spindle 14 (see FIG. 3) is turned by an electric motor 22 which is carried by the rocker arm 12 and the drive shaft 23 of which can be coupled to the spindle by any suitable means, for example a belt and/or chain drive 24.

By turning the spindle 14, the nut member 16 is displaced lengthwise of the rocker arm 12 and therefore the spacing *x* of the hinge pin 15 from the pivotal shaft 21 of the rocker arm can be varied at will. If the spacing *x* is made smaller, then the amplitude of the reciprocating movement of the rack segment 9 is correspondingly reduced and the web B will be fed in shorter steps by the feed rollers 1, 2. In the FIG. 1 embodiment, the crank rod 11 is hinged to the rocker arm 12 by a hinge pin spaced at a constant distance *y* from the pivotal shaft 21 of the rocker arm. It will, however, be appreciated that the hinge pin for the crank rod 11 may instead be carried by the nut member 16 in which case the hinge pin 15 for the connecting rod 13 will be at a fixed spacing from the pivotal shaft 21. Also, the rack 9 may be straight instead of a segment.

The transverse welding equipment S located downstream of the feed rollers 1, 2 comprises an electrically heated welding beam 25 extending above the web across its entire width and a backing roll 26 located below the web. The welding beam is resiliently mounted on rods 27 extending downwardly at the sides of the web and is moved up and down by means of an eccentric 28 which is turned by the shaft 29. The arrangement of the eccentric on the shaft 29 is such that downward movement of the welding beam 25 and resilient seating thereof on the backing roll 26 with the web B disposed therebetween will take place while the feed rollers 1, 2 are stationary. If the equipment S does not also sever each bag after welding, a double-belt conveyor 30 may be provided to engage the web and tear off the completed bag. Alternatively, such a conveyor 30 may simply transport a bag that has already been severed by the equipment S.

The shaft 29 rotates in a counterclockwise direction. Thus, while the crank disc 10 is traversing the upper half of its crank circle, the rack 9 and transmission gears 31 and 4 to 8 will turn in the direction of the arrows indicated for each of these components in FIG. 1 at which time the clutch 32 is engaged and the feed rollers 1, 2 are turning so that the web B is fed in the direction of the arrow *a* by a distance equivalent to the width of each bag to be made. When the crank disc 10 is traversing the lower half of its crank circle, rotation of the various parts is in the opposite direction, at which time the clutch 32 is disengaged, the feed rollers 1, 2 are held stationary by the brake 33 and the welding equipment is operative on the stationary web. During the next feeding step of the web the finished bag may be engaged by the double-belt conveyor 30 and torn from the web along the center of the transverse weld line which will still be soft.

Correct setting of the distance by which the web is fed and thus the width of the bags to be made is carried out during operation of the bagmaking machine by turning the spindle 14 by one of the means previously described.

I claim:

1. Apparatus for intermittently feeding a web of material, comprising a pair of feed rollers, intermittent rotating means for the feed rollers comprising a reciprocatable rack coupled to the feed rollers by transmission gears and a clutch, means for reciprocating the rack, said reciprocating means comprising a reciprocating drive for rocking a rocker arm about a pivot of fixed location by means of a first link hinged to the rocker arm, a second link hinged to the rocker arm and to the rack, and adjusting means on the rocker arm for altering the spacing between the pivot of the rocker arm and the hinge point to the rocker arm of one of the links, said reciprocating drive comprising a crank disc, said first link comprising a crank rod connected to the rocker arm by a first hinge pin and said second link comprising a connecting rod connected to the rocker arm by a second hinge pin, said adjusting means comprising a rotatably mounted screw-threaded spindle extending along the rocker arm and engaged therewith, a nut member which carries one of the hinge pins and is slidable along the rocker arm upon rotation of the spindle, said spindle being rotated by bevel gearing comprising a pinion substantially coaxial with the pivotal axis of the rocker arm and a gear fixed to the spindle.

* * * * *